(12) United States Patent
Shimura et al.

(10) Patent No.: US 7,448,238 B2
(45) Date of Patent: Nov. 11, 2008

(54) PORTABLE DEVICE FOR ELECTRONIC KEY SYSTEM

(75) Inventors: Tokio Shimura, Kariya (JP); Mitsuru Nakagawa, Chiryu (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/019,293

(22) Filed: Dec. 23, 2004

(65) Prior Publication Data

US 2005/0166650 A1  Aug. 4, 2005

(30) Foreign Application Priority Data

Jan. 30, 2004  (JP) .............................. 2004-023880

(51) Int. Cl.
 *B60R 25/02* (2006.01)
(52) U.S. Cl. .................... 70/252; 70/408; 70/456 R; 70/459
(58) Field of Classification Search ............... 70/456 R, 70/459, 252, 408
See application file for complete search history.

(56) References Cited

U.S. PATENT DOCUMENTS

| | | | | | |
|---|---|---|---|---|---|
| 1,885,957 | A | * | 11/1932 | Singleton | 70/456 R |
| 2,566,118 | A | * | 8/1951 | Corwin et al. | 70/456 R |
| 2,694,244 | A | * | 11/1954 | Nolan | 24/650 |
| 3,579,750 | A | * | 5/1971 | Carbon et al. | 24/650 |
| 3,708,032 | A | * | 1/1973 | Suzuki | 180/287 |
| 3,782,145 | A | * | 1/1974 | Wolter | 70/186 |
| 4,569,215 | A | * | 2/1986 | McCarthy | 70/456 R |
| 6,216,501 | B1 | * | 4/2001 | Marquardt et al. | 70/252 |
| 6,382,003 | B1 | * | 5/2002 | Watanuki et al. | 70/252 |
| 6,460,386 | B1 | * | 10/2002 | Watanuki et al. | 70/456 R |
| 6,647,752 | B1 | * | 11/2003 | Chaillie | 70/456 R |
| 6,672,118 | B1 | * | 1/2004 | Wright | 70/459 |
| 2001/0002544 | A1 | * | 6/2001 | Schwab | 70/456 R |

FOREIGN PATENT DOCUMENTS

| | | |
|---|---|---|
| DE | 44 44 913 C2 | 6/1995 |
| JP | U-S58-24284 | 2/1983 |
| JP | A-2002-322841 | 11/2002 |
| JP | A-2003-90152 | 3/2003 |
| JP | A-2003-113683 | 4/2003 |
| WO | WO 2004/003856 | 1/2004 |

OTHER PUBLICATIONS

Document dated Oct. 24, 2007 in corresponding Chinese Patent Application No. 100345468C.

* cited by examiner

*Primary Examiner*—Suzanne D Barrett
(74) *Attorney, Agent, or Firm*—Posz Law Group, PLC

(57) ABSTRACT

The body of a portable device of an electronic key system includes a lock mechanism for removably holding an emergency key held in a housing of the body. The mechanism includes a rotary member and a torsion coil spring. The rotary member is supported rotatably on the body, and when a first end of the member is pushed inward of the body in the direction perpendicular to the rotary shaft, a second end of the member is raised outward of the body. The spring applies a constant force to the first end outward of the body. The second end is formed with a protrusion adapted to be fitted in a hole of the forward end of the key held in the housing. With the key held in the housing, the protrusion is disengaged from the hole and the key can be pulled out by pushing the first end.

8 Claims, 9 Drawing Sheets

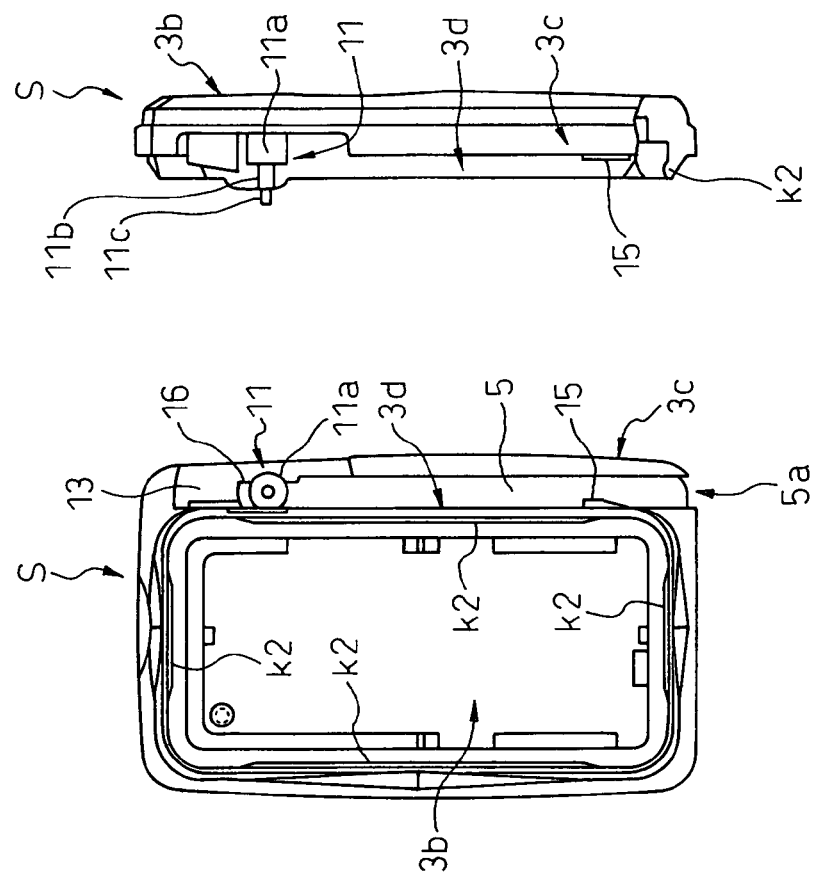

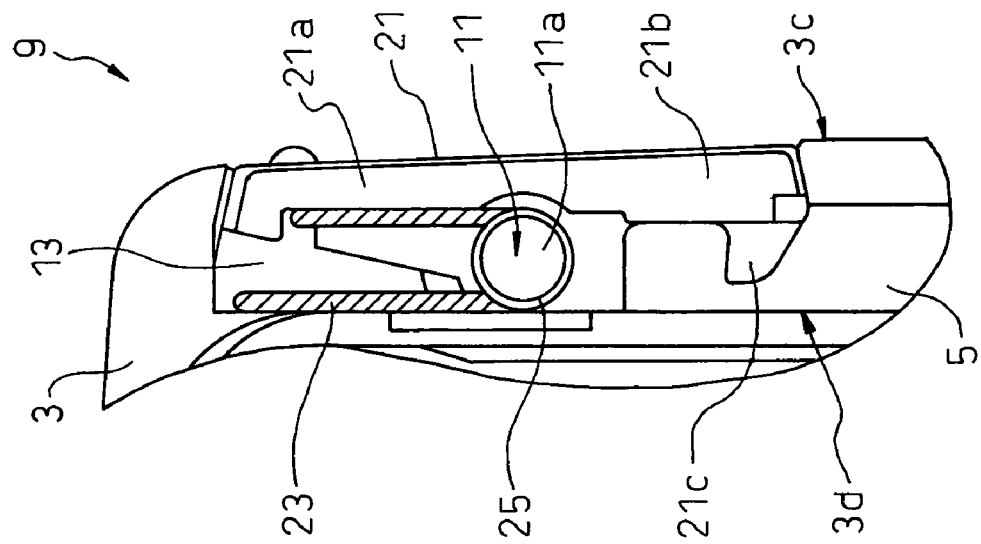
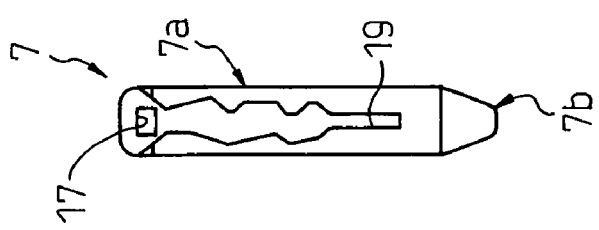
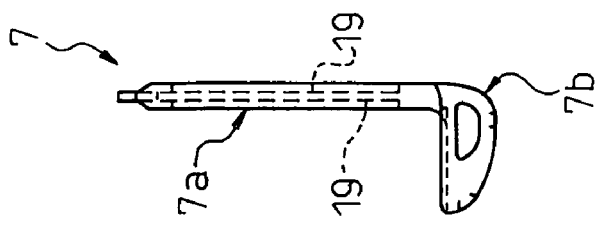

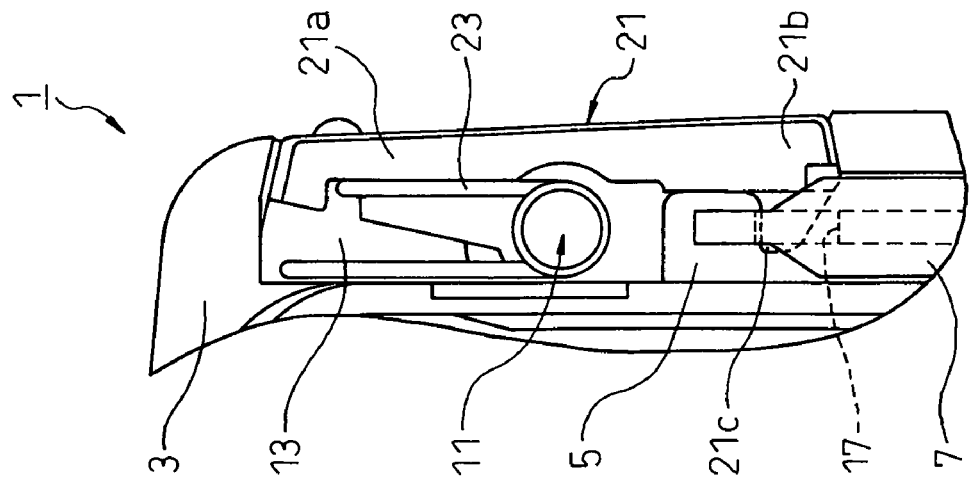
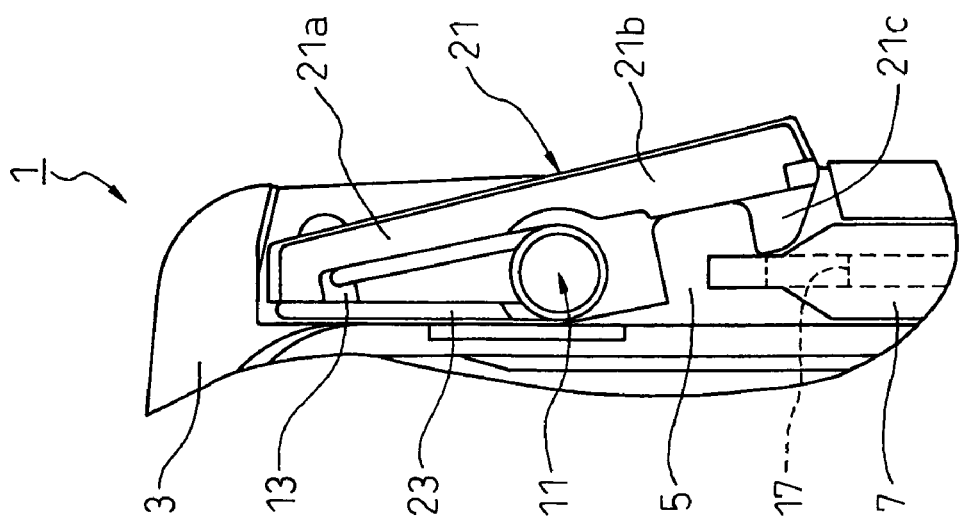

PORTABLE DEVICE FOR ELECTRONIC KEY SYSTEM

BACKGROUND OF THE INVENTION

1. Field of the Invention

The present invention relates to a portable device, carried by a user, for an electronic key system.

2. Description of the Related Art

Conventionally, a known electronic key system checks the ID of the user, by radio communication between the portable device of the user and an electronic device, and performs security functions of locking/unlocking a door. Especially, the electronic key system for an automobile, in which the engine is permitted to start based on the ID check between the portable device and the on-vehicle electronic device, finds practical applications to improve the anti-theft effect.

In the electronic key system of this type, in preparation for the power failure of the battery of the portable device, an emergency key providing a mechanical key (key plate) is encased in a housing formed in the body of the portable device.

Further, in the portable device of the conventional electronic key system, a lock mechanism is constructed in the body to prevent the emergency key from easily coming off from the housing formed in the body.

As shown in FIGS. 8A, 8B, for example, a body 103 of a portable device 101 includes a lock mechanism having a manually slidable slide member 105 and a spring 107 adapted urge the slide member 105 in a predetermined direction. A protrusion 105a formed on the side of the slide member 105 far from the spring 107 is fitted in the engaging groove 111a of an emergency key 111 inserted in the housing 109 of the body 103. In this way, the emergency key 111 is prevented from coming off from the housing 109. In this example of the configuration, the slide member 105 is slid against the urging force of the spring 107 (i.e. leftward in FIGS. 8A, 8B), the protrusion 105a of the slide member 105 comes off from the engaging groove 111a, and the emergency key 111 can be pulled off from the housing 109 of the body 103. FIG. 8A is a front view of the portable device 101 and FIG. 8B a left side view thereof (Refer to Japanese Patent Publication No. 2002-32284 (FIG. 3)).

As described above, in the conventional portable device 101, the operation of mounting or demounting the emergency key 111 (specifically, the operation of fitting or removing the protrusion 105a in and from the engaging groove 111a) can be performed by sliding the whole slide member 105. In this case, a space for sliding the slide member 105 is formed on the body 103 of the portable device 101. For this purpose, a large space is required due to the fact that the whole slide member 105 is slid, thereby posing a stumbling block to reducing the size of the portable device.

SUMMARY OF THE INVENTION

Accordingly, it is an object of this invention to reduce the size of an electronic key system.

With the portable device of an electronic key system, according to a first aspect of the present invention, made in order to accomplish the above object, an emergency key inserted and encased in a housing formed in the body of the portable device is formed with an engaging portion constituting a selected one of a groove and a hole in addition to the keyway of the emergency key.

Specifically, a lock mechanism included in the body of the portable device to removably hold the emergency key inserted in the housing includes a rotatable member rotatably supported on the body of the portable device and adapted to rise outward of the body of the portable device as the result of the first end of the rotatable member being pushed inward of the body of the portable device.

Moreover, the part of the rotatable member nearer to the second end than to the rotary shaft is formed with a protrusion extending into the housing and adapted to be fitted in the engaging portion of the emergency key held in the housing.

In order to achieve this object, according to a first aspect of the invention, there is provided a portable device for the electronic key system, in which an emergency key can be encased in a housing in the following steps.

First, a rotary member is pushed by a first end thereof inward the portable device body. Then, a second end of the rotary member rises outward of the portable device body.

Under this condition, the emergency key is inserted into a predetermined position (i.e. a position where a protrusion can fit in an engaging portion) by way of an insertion hole, and the second end of the rotary member is pushed inward. Then, the protrusion comes to fit in the engaging portion of the emergency key, and the emergency key can be held in the housing.

The emergency key thus held in the housing can be pulled out of the housing by disengaging the fitted state. Specifically, the first end of the rotary member is pushed inward. Then, the second end is raised outward of the portable device body, so that the protrusion and the engaging portion are disengaged from each other. In this way, the emergency key can be pulled out of the housing.

In the portable device according to the first aspect of the invention described above, the portable device body (hence, the portable device) can be reduced in size.

Specifically, in the conventional portable device 101, a space of a size allowing the whole slide member 105 to slide over a predetermined length is required to be formed in the body 103 independently of the housing 109. In the portable device according to the first aspect of the invention, on the other hand, a space is required only of such a size as to allow the first end of the rotary member to enter the portable device body to about the extent that the emergency key inserted into the housing and the protrusion are kept out of contact with each other.

Next, with the portable device according to a second aspect, in the portable device according to the first aspect, the protrusion is so shaped that the height thereof increases progressively from the end of the housing nearer to the emergency key insertion hole toward the highest point of the protrusion.

As described above, with the portable device according to the second aspect of the invention, the first end of the rotary member is not required to be pushed before encasing the emergency key in the housing.

Specifically, initially when the second end of the rotary member is not yet raised outward of the portable device body, the emergency key is inserted into the insertion hole of the housing. The forward end of the emergency key comes into contact with the protrusion (more specifically, the end of the protrusion nearer to the insertion hole) of the rotary member. With a further insertion of the emergency key, the protrusion is gradually lifted outward of the portable device body by the emergency key, thereby gradually raising the second end of the rotary member outward of the portable device body.

The emergency key can be encased in the housing, therefore, by simply inserting the emergency key to the predetermined position, pushing the second end of the rotary member raised outward of the portable device body back to the original position from outside the portable device body (i.e. to the state in which the second end of the rotary member is raised outward of the portable device body), and fitting the protrusion in the engaging portion of the emergency key.

In this way, the job of encasing the emergency key in the housing can be simplified.

Next, with the portable device according to a third aspect, in the portable device according to the first or second aspect, the lock mechanism includes an urging member for applying, to the rotary member with the second end thereof raised outward of the body of the portable device, such a force as to restore the second end to the state before being raised outward of the body of the portable device.

With the portable device according to a third aspect of the invention, the protrusion of the rotary member can be fitted in the engaging portion of the emergency key without pushing back the second end of the rotary member that has been raised outward of the portable device body, and therefore the emergency key can be encased easily in the housing.

Next, with the portable device according to a fourth aspect, in the portable device according to one of the first to third aspects, the engaging portion is formed in the neighborhood of the forward end of the emergency key. The rotary shaft is arranged at right angles to the direction in which the emergency key is slid into or out of the housing, and the second end of the rotary member is arranged nearer to the insertion hole of the housing in which the emergency is inserted.

With the portable device according to a fourth aspect of the invention, if the user tries to pull out the emergency key from the housing with the protrusion of the rotary member fitted in the engaging portion of the emergency key, as the force perpendicular to the rotary shaft is exerted on the rotary shaft, the emergency key has a smaller impact on the rotary shaft and the rotary member.

In this connection, with the portable device according to a fourth aspect, like the portable device according to the fifth aspect, the rotary shaft is preferably located on a selected one of the longitudinal center axis of the emergency key held in the housing inside the body and inward of the portable device from the longitudinal center axis of the emergency key.

Specifically, in the case where the user tries to pull out the emergency key from the housing while the protrusion of the rotary member is fitted in the engaging portion of the emergency key, the force is not applied to the rotary member in the direction of disengaging the protrusion from the engaging portion of the emergency key (i.e. the direction in which the second end is rotated outward of the portable device body), and therefore the emergency key is prevented from readily coming off.

Next, with the portable device according to a sixth aspect, in the portable device according to the fourth or fifth aspect, the housing is defined by three side walls including two opposed outer walls of the body of the portable device and a third outer wall (hereinafter referred to as the central outer wall) between the two opposed outer walls, and the rotary member is arranged on the central outer wall. That is, with the portable device according to a sixth aspect, the housing is arranged at the side of the body of the portable device.

With the portable device according to a sixth aspect of the invention, the required component units (such as the microcomputer, communication circuits, and other electronic circuits) can be arranged efficiently in the portable device body in advance, thereby further reducing the size of the portable device body (hence, the portable device).

With the portable device according to a seventh aspect of the invention, the keyway of the emergency key of the portable device of the electronic key system according to the sixth aspect forms a longitudinal depression in the emergency key.

The portable device body is formed in such a manner that it can be disassembled into a first portion including one of the two outer walls and a second portion including the other outer wall and the rotary member.

Further, at least one of the outer wall having the rotary member of the second portion and the wall in the portable device body constituting another wall of the housing is formed with a protruded portion extending into the housing. With the emergency key held in the housing, this protruded portion is fitted in the keyway of the emergency key.

As described above, with the portable device according to the seventh aspect of the invention, if the portable device body with the emergency key held in the housing is disassembled into two portions including a first portion and a second portion lower than the first portion, as before disassembly, not only the protrusion of the rotary member is fitted in the engaging portion of the emergency key, but also the protruded portion is fitted in the keyway of the emergency key. Thus, the emergency key is prevented from readily coming off from the second portion. Also, when the portable device body is disassembled, the emergency key with the engaging portion thereof fitted with the protrusion of the rotary member is prevented from jumping out of the second portion and damaging the rotary member.

In the case where the central outer wall is divided into the first portion and the second portion by disassembling the portable device portion into two portions, the central outer wall of the second portion corresponds to the part of the outer wall of the second portion having the rotary member. In the case where the central outer wall is not divided (i.e. the whole central outer wall is included in the second portion) when the portable device body is disassembled, on the other hand, the central outer wall corresponds to the part of the outer wall of the second portion having the rotary member.

The present invention may be more fully understood from the description of preferred embodiments of the invention set forth below, together with the accompanying drawings.

BRIEF DESCRIPTION OF THE DRAWINGS

FIGS. 2A to 2G are diagrams showing a configuration of the body, the emergency key and the lock mechanism of the portable device.

FIGS. 5A and 5B are diagrams for explaining the steps of encasing the emergency key in the housing.

DESCRIPTION OF THE PREFERRED EMBODIMENTS

A portable device of an electronic key system according to an embodiment of the invention is explained below with reference to the accompanying drawings. The portable device according to this embodiment is used as an electronic key unit of the user in a smart key system, doubling as an immobilizer system, in which an ID is checked by radio communication between a compact electronic unit carried by the user and an on-vehicle electronic unit, and based on the check result, a vehicle door is locked/unlocked or an engine start is permitted.

Figure 1A:
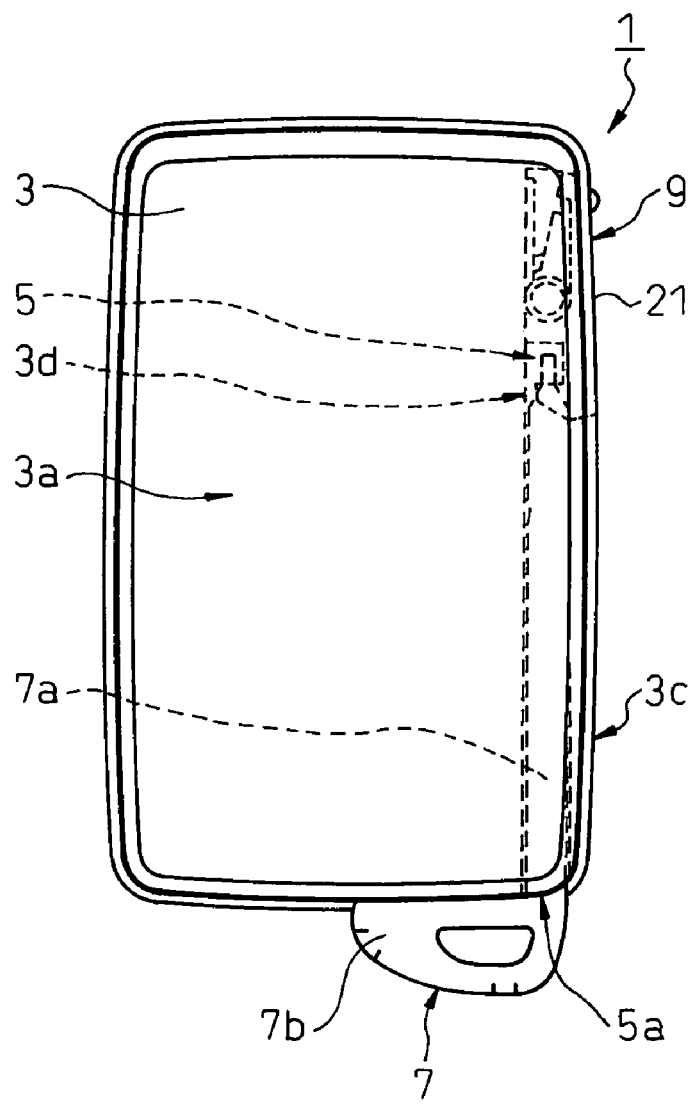
FIGS. 1A and 1B are diagrams showing a configuration of the portable device according to an embodiment of the invention.
Figure 1B:
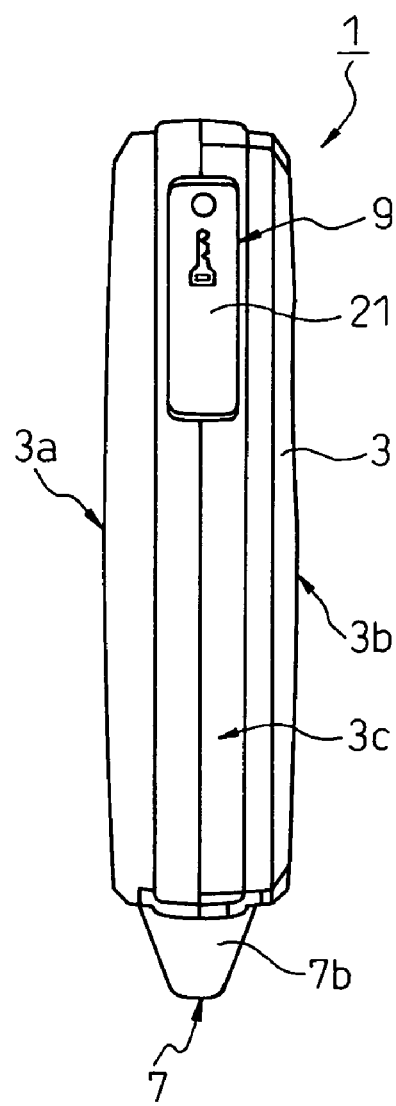

FIGS. 1A and 1B show a configuration of the portable device 1 according to this embodiment. FIG. 1A is a front view of the portable device 1, and FIG. 1B a right side view of the portable device 1.

The portable device 1 comprises a substantially parallelepipedal body 3 of resin (hereinafter referred to as the portable device body) containing therein an ID check communication processing unit including an antenna, a transceiver circuit and a microcomputer, for radio communication for an ID check with a communication circuit of the on-vehicle electronic unit, a battery for activating the ID check communication processing unit and a transponder for performing the ID check operation by radio communication of electromagnetic induction type with the transceiver circuit of the on-vehicle electronic unit in case the battery power runs out. These internal electronic circuits are ordinary ones and therefore not shown in the drawings. In the description that follows, the outer wall of the body 3 is divided into a front outer wall called a front wall 3a and an outer wall called a back wall 3b on the other side of the portable device 1 far from the front wall 3a in FIG. 1A.

The body 3 has a housing 5 defined by the side walls including the front wall 3a, the back wall 3b, an outer wall 3c (hereinafter referred to as the central outer wall) on the right side in FIG. 1A and an inner wall 3d parallel to the length of the central outer wall 3c formed in the body 3. Under normal conditions, a mechanical emergency key 7, to be used in case battery power runs out, is inserted and held in the housing 5.

Further, the body 3 includes a rotary member 21 making up a lock mechanism 9 for removably holding the emergency key 7 in the housing 5.

The emergency key 7 is used by being inserted in the key cylinder of the vehicle door to lock/unlock the door if the battery power of the portable device 1 runs out.

Now, the configuration of the portable device 1 is explained in detail with reference to FIGS. 2 to 4. FIG. 2 shows a configuration of each part of the portable device 1, FIG. 3 a diagram for explaining the lock mechanism 9, and FIG. 4 a diagram for explaining the steps of mounting the lock mechanism 9 on the body 3.

First, as shown in FIGS. 2A to 2D, the body 3 can be disassembled into a first portion P having the front wall 3a and a second portion S having the back wall 3b. FIG. 2A is a front view of the first portion P, and FIG. 2B a right side view of the first portion P. FIG. 2C is a front view of the second portion S, and FIG. 2D a right side view of the second portion S.

Each of the four outer walls other than the front wall 3a and the back wall 3b of the body 3 can be divided into the first portion P and the second portion S. The central outer wall 3c, for example, as shown in FIGS. 2B, 2D, is divided into the first portion P and the second portion S along the length thereof. By mounting the first portion P on the second portion S, therefore, the four outer walls are formed.

As shown in the lower part of the sectional views of FIGS. 2B, 2D, the first portion P includes a plurality of fitting portions k1 for integrally holding the first portion P and the second portion S, which in turn includes a plurality of fitting portions k2 to be fitted on the fitting portions k1 of the first portion P. As shown in FIG. 2C, each fitting portion k2 of the second portion S is arranged on the inner wall 3d and the outer walls other than the central outer wall 3c. The fitting portions k1 of the first portion P, though partly not shown in FIG. 2B, are arranged at positions corresponding to those of the fitting portions k2 of the second portion S.

A cylindrical protrusion 11 extending inward of the body 3 at right angles thereto and having a diameter reduced in three steps toward the forward end from the root thereof is formed, as shown in FIGS. 2C, 2D, on the back wall 3b of the body 3 on the side of the housing 5 far from the insertion hole 5a for the emergency key 7.

Further, a space 13 is formed on the side of the protrusion 11 far from the housing 5.

The inner wall 3d of the body 3 is formed with a protruded portion 15 extending toward the housing 5 on the side of the housing 5 near to the insertion hole 5a. The protruded portion 15 is fitted in the keyway 19 (FIG. 2E) formed on the emergency key 7 when held in the housing 5.

Furthermore, a depression 16 recessed more than the root of the protrusion 11 is formed on the root of the protrusion 11 near to the space 13 on the back wall 3b of the body 3.

The emergency key 7, as shown in FIGS. 2E, 2F, includes a long key plate (the portion encased in the housing 5) 7a of metal, and a grip 7b of resin used when operating the emergency key 7. FIG. 2E is a front view and FIG. 2F a right side view of the emergency key 7.

The two surfaces (left and right side surfaces in FIG. 2E) of the key plate 7a of the emergency key 7 are each formed, as shown in FIG. 2F, with a corrugated depression extending from the grip 7b over a predetermined length to the neighborhood of the forward end of the emergency key 7 (i.e. the end of the emergency key 7 far from the grip 7b) in parallel to the length of the key plate 7a. Further, a delta-shaped recessed keyway 19 is expanded toward the forward end from the neighborhood thereof. The delta-shaped portion is formed with a hole 17 (corresponding to the engaging portion) through the key plate 7a. The corrugated portion of the keyway 19 of the emergency key 7 is shaped differently for different vehicles.

The lock mechanism 9 is arranged on the side of the housing 5 far from the insertion hole 5a as shown in FIG. 2G. In FIG. 2G, the lock mechanism 9 is shown in a form enlarged from FIGS. 2A to 2F. The hatched section represents a torsion coil spring 23 described later.

The lock mechanism 9 includes a long rotary member 21 rotatably supported on the base cylindrical portion 11a and the central cylindrical portion 11b (hereinafter collectively referred to also as the rotary shaft 11) of the protrusion 11 of the body 3, whereby the emergency key 7 inserted in the housing 5 is held in the housing 5.

One longitudinal end (hereinafter referred to as the first end 21a) of the rotary member 21 which is nearer to the space 13 than the rotary shaft 11, when pushed inward of the body 3, intrudes into the space 13 of the body 3, while at the same time raising the second end (i.e. the end nearer to the housing 5 than the rotary shaft 11) 21b outward of the body 3.

A protrusion 21c extending into the housing 5 and adapted to be fitted in the hole 17 of the emergency key 7 held in the housing 5 is formed on the side of the rotary member 21 nearer to the second end 21b. The protrusion 21c is formed with the height thereof progressively increased from the end of the housing 5 nearer to the insertion hole 5a toward the highest point of the protrusion 21c while the rotary member 21 is mounted on the body 3.

Figure 3A:
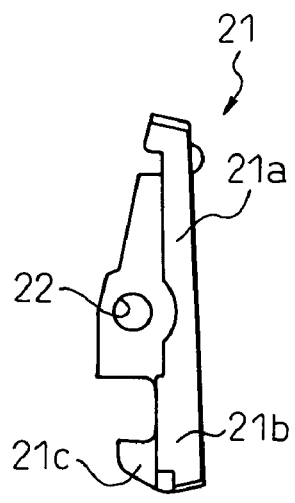
FIGS. 3A to 3E are diagrams for explaining the lock mechanism.
Figure 3B:
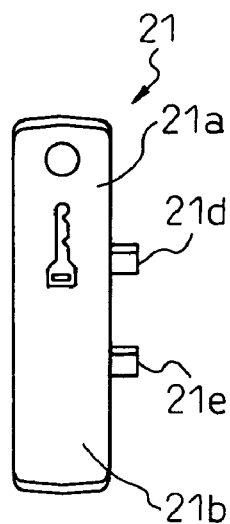
Figure 3C:
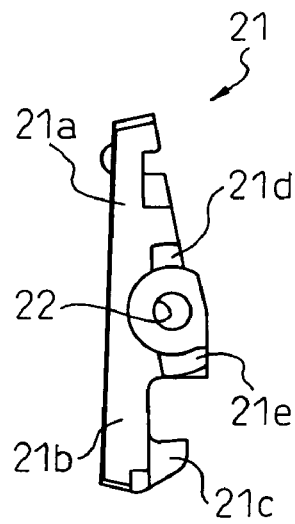

Further, as shown in FIGS. 3A, 3C, the central portion of the rotary member 21 is formed with a hole 22 for mounting the rotary member 21 on the protrusion 11 of the body 3. The hole 22 is so shaped as to be snugly fitted on the base cylindrical portion 11a and the central cylindrical portion 11b of the protrusion 11 of the body 3.

Furthermore, as shown in FIGS. 3B, 3C, the side of the hole 22 nearer to the first end 21a and the side of the hole 22 nearer to the second end 21b are formed with protrusions 21d and 21e, respectively, extending from the rotary member 21. The protrusion 21d nearer to the first end 21a of the rotary member 21 is adapted to fit in the depression 16 of the body 3 and move in the depression 16 with the rotation of the rotary member 21. The protrusion 21e nearer to the second end 21b, on the other hand, is adapted to be fitted in the housing 5 and move in the housing 5 with the rotation of the rotary member 21.

FIG. 3A is a front view, FIG. 3B a right side view and FIG. 3C a rear view of the rotary member 21.

Figure 3D:
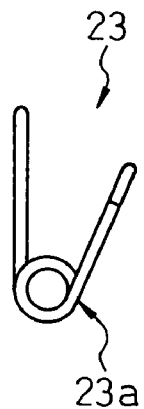
Figure 3E:
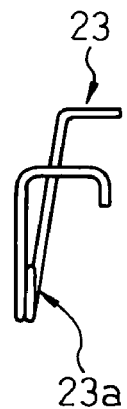

The lock mechanism 9 includes a torsion coil spring 23 (corresponding to the urging member in claim 2) as shown in FIGS. 3D, 3E for keeping the first end 21a of the rotary member 12 urged outward of the portable device body 3. FIG. 3D is a front view showing the torsion coil spring 23 before being mounted on the body 3, and FIG. 3E a right side view of the torsion coil spring 23.

This lock mechanism 9 is assembled by executing the following steps.

Figure 4A:
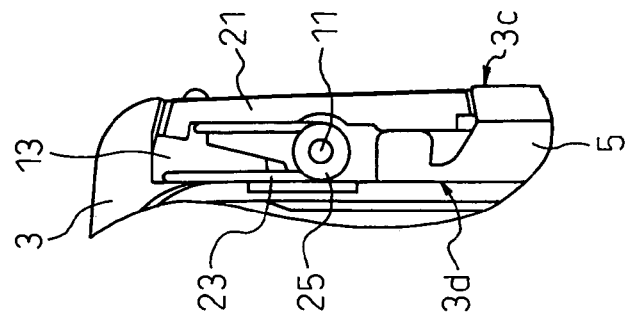
FIGS. 4A to 4D are diagrams for explaining the steps of mounting the lock mechanism on the body.

Beginning with the state in which nothing is mounted as shown in FIG. 4A, the rotary member 21 is mounted on the protrusion 11 of the body 3 in such a manner that the protrusion 11 is inserted through the hole 22 of the rotary member 21. Then the base cylindrical portion 11a and the central cylindrical portion 11b of the protrusion 11 of the body 3 are snugly fitted in the hole 22 of the rotary member 21. Thus, the rotary member 21 is supported on the protrusion 11 of the body 3 and rotatable around the center axis of the protrusion 11. In the case where the second end 21b of the rotary member 21 is rotated inward of the body 3, the protrusion 21d on the side of the rotary member 21b nearer to the first end 21a is caught by the end of the depression 16 of the body 3 in a predetermined position. At the same time, the protrusion 21e nearer to the second end 21b comes into contact with the inner wall 3d of the body 3, thereby keeping the second end 21b off the housing 5.

Figures 4B, 4C:
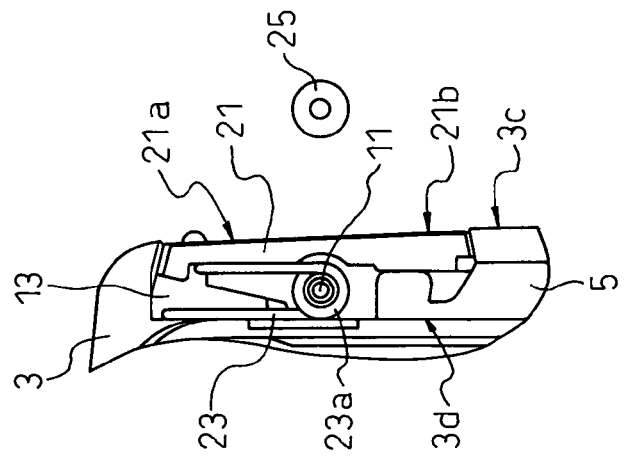

As shown in FIG. 4C, the coil portion 23a of the torsion coil spring 23 is inserted to reach the central cylindrical portion 11b of the protrusion 11 of the body 3, while at the same time bringing one of the ends of the torsion coil spring 23 into contact with the surface of the first end 21a nearer to the spaced 13, and the other end into contact with the surface of the inner wall 3d nearer to the space 13. As a result, the torsion coil spring 23 applies the force described above to the first end 21a of the rotary member 21.

Figure 4D:
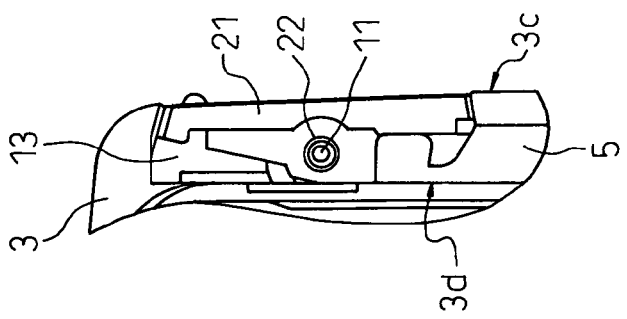

As shown in FIG. 4D, a washer 25 is mounted on the cylindrical portion 11c nearer to the forward end of the protrusion 11 of the body 3, and the cylindrical portion 11c extending beyond the washer 25 is melted by heat and welded with the washer 25. As a result, as shown in FIG. 2G, the washer 25 is fixedly assembled on the body 3 and, in the case where the body 3 is disassembled into two parts, the rotary member 21 and the torsion coil spring 23 are prevented from easily coming off from the body 3 (or specifically, the second portion S).

Next, the steps of holding the emergency key 7 in the housing 5 of the portable device 1 having the above-mentioned configuration is explained with reference to FIGS. 5A and 5B. FIG. 5A shows the state immediately before the emergency key 7 is completely held in the housing 5, and FIG. 5B the state in which the emergency key 7 is held in the housing 5.

First, the emergency key 7 is inserted from the insertion hole 5a (FIG. 2) of the housing 5. The forward end of the emergency key 7 comes into contact with the protrusion 21c (more specifically, the forward end of the protrusion 21c near to the insertion hole 5a) of the rotary member 21.

With further insertion of the emergency key 7, as shown in FIG. 5A, the protrusion 21c is raised outward of the body 3, and the second end 21b of the rotary member 21 rises outward of the body 3.

After further inserting the emergency key 7, when the hole 17 of the emergency key 7 reaches the protrusion 21c of the rotary member 21, the rotary member 21 is restored to the original position (i.e. the state before rotation of the rotary member 21) by the urging force of the torsion coil spring 23.

Specifically, with the insertion of the emergency key 7 into the housing 5, the instant when the forward end of the emergency key 7 comes into contact with the protrusion 21c of the rotary member 21, the rotary member 21 is automatically rotated against the urging force of the torsion coil spring 23. With further insertion of the emergency key 7 into the depth of the housing 5, the instant the hole 17 of the emergency key 7 reaches the protrusion 21c of the rotary member 21, the rotary member 21 is automatically rotated in the opposite direction by the urging force of the torsion coil spring 23. As a result, the protrusion 21c of the rotary member 21 is fitted in the hole 17 of the emergency key 7, and thereby the emergency key 7 is held in the housing 5.

Figure 6A:
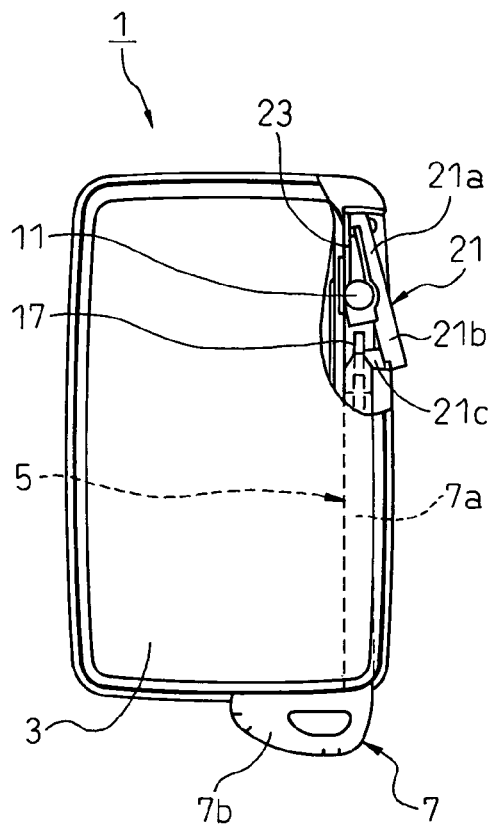
FIGS. 6A and 6B are diagrams for explaining the steps of pulling out the emergency key from the housing.

Next, the steps of pulling out the emergency key 7 from the housing 5 are explained with reference to FIGS. 6A and 6B. FIG. 6A shows the state in which the hole 17 of the emergency key 7 is disengaged from the protrusion 21c of the rotary member 21, and FIG. 6B the state in which the emergency key 7 is pulled off from the housing 5.

First, the first end 21a of the rotary member 21 is pushed inward of the body 3. As shown in FIG. 6A, the second end 21b rises outward of the body 3, and the protrusion 21c and the hole 17 of the emergency key 7 are disengaged from each other.

Figure 6B:
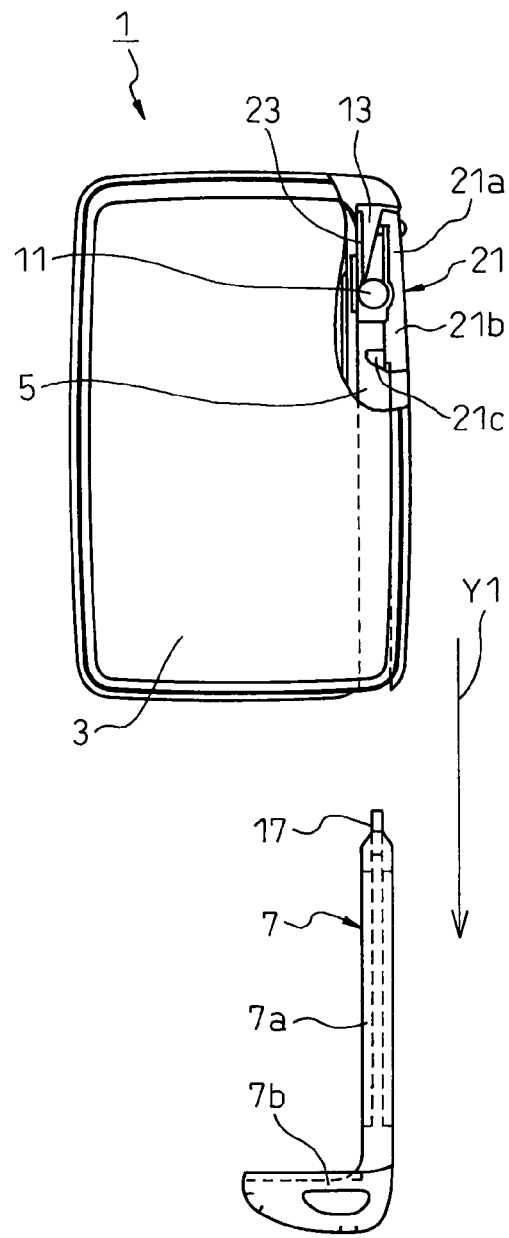

While the first end 21a of the rotary member 21 is kept pushed, as shown by arrow Y1 in FIG. 6B, the grip 7b of the emergency key 7 is pulled outward of the body 3. Thus, the emergency key 7 can be pulled out of the housing 5.

Once the first end 21a of the rotary member 21 stops being pushed, the rotary member 21 is restored to the original position (i.e., the state before the first end 21a of the rotary member 21 is pushed) by the urging force of the torsion coil spring 23.

With the portable device 1 according to this embodiment described above, the emergency key 7 can be removably held in the housing 5 simply by the availability, in addition to the housing 5, of a space (i.e., the space 13) into which the first end 21a of the rotary member 21 is allowed to enter to such a degree that the emergency key 7 that has been inserted into the housing 5 is kept out of contact with the protrusion 21c. As a result, the body 3 (hence, the portable device 1) can be reduced in size.

With the portable device 1 according to this embodiment, the housing 5 and the space 13, with the rotary shaft 11 therebetween, are aligned with each other beside the body 3 (i.e., the side of the outer wall 3c near the center than the inner wall 3d of the body 3). Therefore, the electronic circuits mounted on the body 3 in advance can be efficiently arranged, resulting in a further reduced size.

With the protrusion 21c of the rotary member 21 fitted in the hole 17 of the emergency key 7, if the user tries to pull out the emergency key 7 from the housing 5, the force in the direction perpendicular to the rotary shaft 11 is exerted on the rotary shaft 11, and therefore the impact applied by the emergency key 7 to the rotary shaft 11 and the rotary member 21 is reduced.

In encasing the emergency key 7 in the housing 5, on the other hand, the simple insertion of the emergency key 7 rotates the rotary member 21 automatically until it is fitted on the protrusion 21c. Thus, the job of encasing the emergency key 7 is simplified.

After the emergency key 7 is encased in the housing 5, the rotary member 21 continues to hold the emergency key 7 with the urging force of the torsion coil spring 23, and therefore the emergency key 7 will not easily come off.

Further, with the portable device 1 according to this embodiment, the center of the rotary shaft 11 is aligned with the longitudinal center axis of the emergency key 7 encased in the housing 5. In the case where the user tries to pull the emergency key 7 out from the housing 5 with the protrusion 21c of the rotary member 21 fitted in the hole 17 of the emergency key 7, therefore, the emergency key 7 fails to apply the turning effort (hereinafter referred to as the outer turning effort in contrast with the inner turning effort exerted in the opposite direction) to the rotary member 21 in the direction of disengaging the protrusion 21c from the hole 17 of the emergency key 7. Thus, the emergency key 7 is positively prevented from coming off.

In the case where the battery power runs out, the battery can be changed by disassembling the body 3 into the first portion P and the second portion S in such a manner that the second portion S of the body 3 comes under the first portion P.

If the body 3 is disassembled as described above with the emergency key 7 held in the housing 5, the protrusion 21c of the rotary member 21 is fitted in the hole 17 of the emergency key 7 on the one hand and the protruded portion 15 is fitted in the keyway 19 (more specifically, the recessed portion of the keyway 19 parallel to the length of the key plate 7a) of the emergency key 7 on the other hand. The emergency key 7 thus is prevented from coming off easily from the second portion S. Also, at the time of disassembling the body 3, the emergency key 7 with the protrusion 21c of the rotary member 21 fitted in the hole 17 has a lesser chance of jumping out of the second portion S, and therefore the behavior of the emergency key 7 is less likely to damage the rotary member 21.

An embodiment of the invention has been explained above. Nevertheless, the invention can be embodied in various forms.

For example, the center of the rotary shaft 11 may be located outside the body 3 from the longitudinal center axis of the emergency key 7 encased in the housing 5. In this case, the outer turning effort described above is generated for the rotary member 21 when the user tries to pull the emergency key 7 out from the housing 5. This inconvenience is obviated by providing a torsion coil spring 23 which generates an urging force (the force for restoring the first end 21a of the rotary member 21 to the original position) larger than the outer turning effort.

Figure 7:
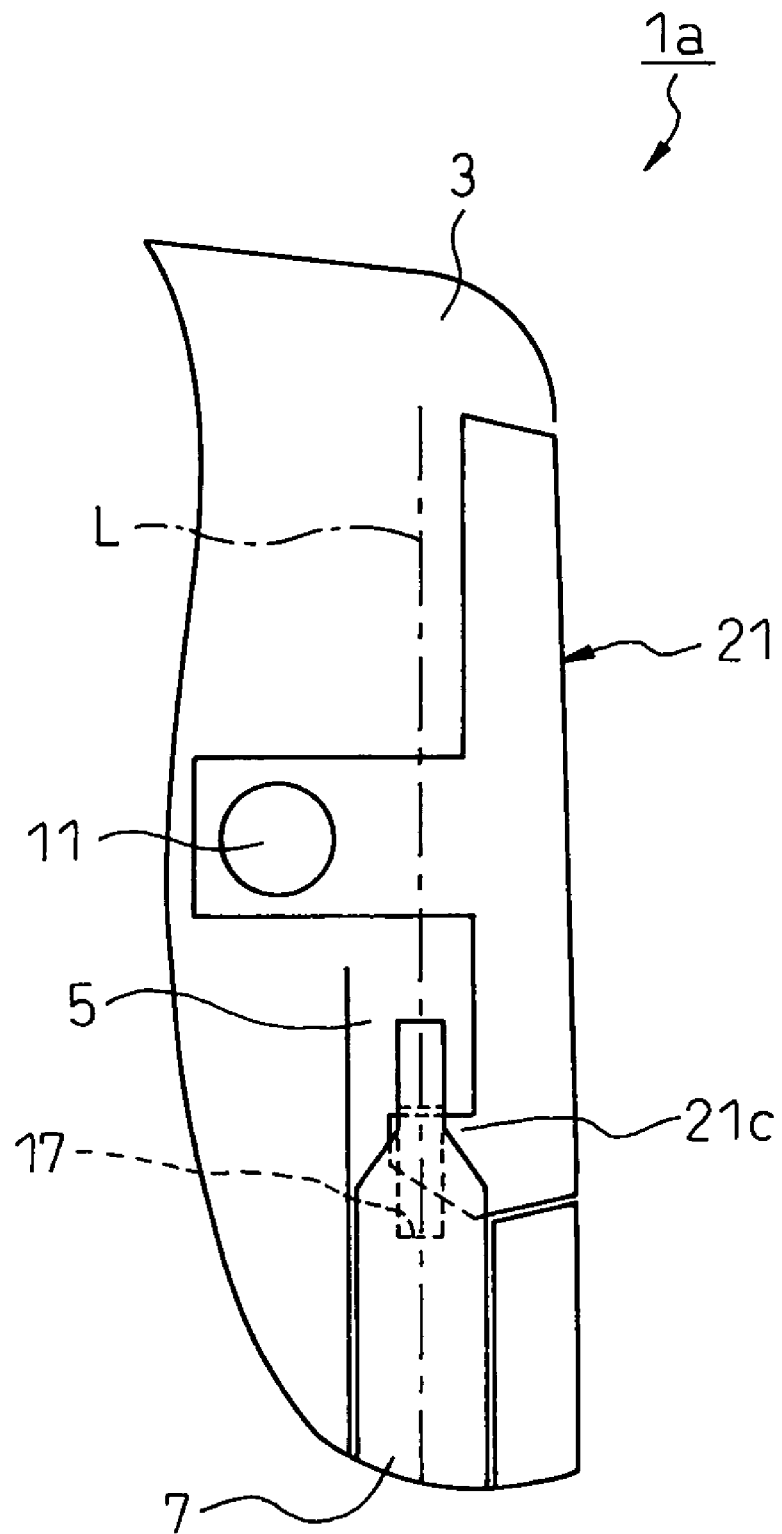
FIG. 7 is a schematic diagram for explaining the portable device according to a modification.
Figure 8A:
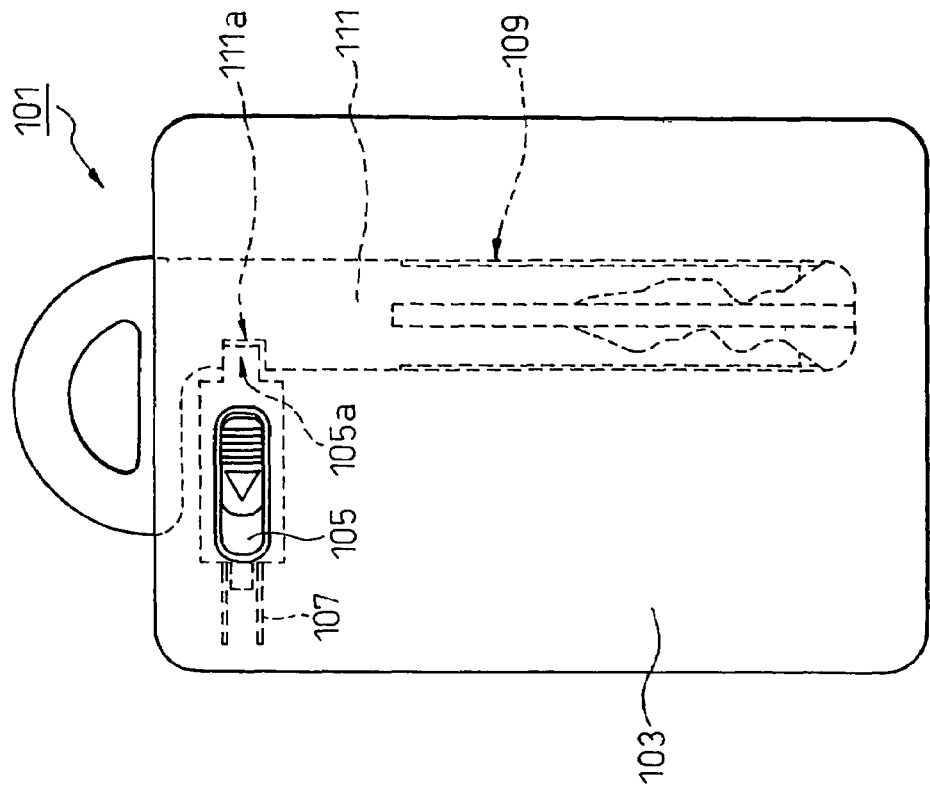
FIGS. 8A and 8B are diagrams for explaining the portable device of the conventional electronic key system.
Figure 8B:
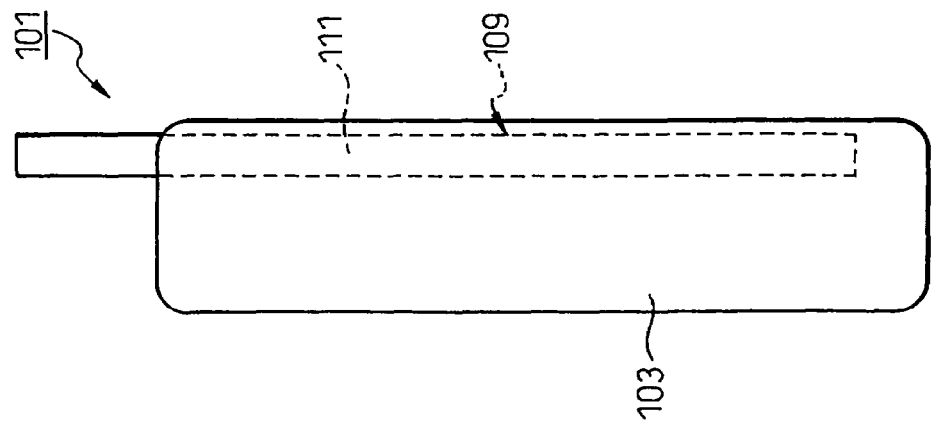

The portable device 1 according to this embodiment may be modified as is the portable device 1a shown in FIG. 7. FIG. 7 is a diagram schematically showing the rotary member 21 of the portable device 1a with the emergency key 7 held in the housing 5. In FIG. 7, the same component elements as those in FIGS. 1 to 6 are designated by the same reference numerals, respectively, and therefore not described again in detail.

The one-dot chain in FIG. 7 is an imaginary line L indicating the longitudinal center axis of the emergency key 7 held in the housing 5.

In the portable device 1a, the center of the rotary axis 11 is arranged inside the body 3 from the imaginary line L.

In this configuration, a user attempting to pull the emergency key 7 out from the housing 5 applies the inner turning effort to the rotary member 21, and therefore the emergency key 7 is prevented more positively from coming off. The larger the inner turning effort, the rotary shaft 11 is located more inward of the body 3 from the imaginary line L. The inner turning effort, therefore, can be increased, for the portable device 1a, to more than that of the portable device 1 according to the embodiment described above. In the portable device 1a, therefore, the inner turning effort can be increased and the emergency key 1 can be prevented from coming off more advantageously than in the portable device 1 according to the above-mentioned embodiment. The configuration of the portable device 1 according to the embodiment described above in which the center of the rotary shaft 11 is aligned with the longitudinal center axis of the emergency key 7 held in the housing 5, however, is more advantageous from the viewpoint of reducing the size of the body 3.

The urging member for applying the force to the rotary member to restore the first end 21a of the rotary member 21 to the state before being pushed into the space 13 of the body 3 is not limited to the torsion coil spring 23 but may be any member of any structure capable of applying the force to the rotary member 21 to restore the rotary member 21 to the original position.

The rotary member 21 can be arranged in any manner on the body 3 as long as the emergency key 7 inserted in the housing 5 can be removably held. For example, the rotary member 21 can be arranged on the front wall 3a of the body 3.

In this case, the rotary shaft 11 may be configured in parallel to the direction in which the emergency key 7 is slid longitudinally into or away from the housing 5. The configuration of the portable device 1 according to this embodiment in which the length of the rotary shaft 11 is perpendicular to the direction of slide, however, can more advantageously reduce the shock which the emergency key 7 gives to the rotary shaft 11 and the rotary member 21.

According to this embodiment, the rotary member 21 is prevented from coming off from the body 3 by melting the protrusion 11 of the body 3 by heat. The invention, however, is not limited to this method, but may employ such a method that a threaded portion is formed at the forward end of the protrusion 11 of the body 3 and a screw is mounted on the threaded portion thereby to prevent the rotary member 21 from coming off from the body 3.

Also, the rotary shaft 11 may be formed on the rotary member 21 instead of on the portable device body 3.

The portable device body 3 may take any of various shapes including a substantial parallelepiped.

Further, this invention finds various applications in the electronic key system in various fields including the housing as well as in the electronic key system for vehicles.

While the invention has been described by reference to specific embodiments chosen for purposes of illustration, it should be apparent that numerous modifications could be made thereto by those skilled in the art without departing from the basic concept and scope of the invention.

The invention claimed is:

1. A portable device for an electronic key system,
   wherein an emergency key inserted and encased in a housing formed in a body of the portable device is formed with an engaging portion constituting a selected one of a groove and a hole in addition to a keyway of the emergency key, the engaging portion being formed substantially in a forward end of the emergency key disposed opposite to a grip of the emergency key, wherein a lock mechanism included in the body of the portable device to removably hold the emergency key inserted in the housing includes a rotatable member rotatably supported on the body of the portable device, the rotatable member including a first end and a second end, the rotatable member being adapted to rise outward of the body of the portable device as the result of the first end of the rotatable member being pushed inward of the body of the portable device, wherein the second end of the rotary member is arranged nearer to an insertion hole of the housing in which the emergency key is inserted, and wherein a part of the rotatable member nearer to the second end of the rotary member than to a rotary shaft is formed with a protrusion extending into the housing and adapted to be fitted in the engaging portion of the emergency key held in the housing, wherein the rotary shaft is arranged at right angles to the direction in which the emergency key is slid into or out of the housing, wherein the rotary shaft is located on a longitudinal center axis of the emergency key held in the housing inside the body.

2. A portable device for an electronic key system according to claim 1, wherein the protrusion is so shaped that the height thereof increases progressively from the end of the housing nearer to the emergency key insertion hole toward the highest point of the protrusion.

3. A portable device for an electronic key system according to claim 1, wherein the lock mechanism includes an urging member, wherein when the second end of the rotary member is raised outward from the body of the portable device, the urging member applies a force to the rotary member to restore the second end to the state before being raised outward of the body of the portable device.

4. A portable device for an electronic key system according to claim 1, wherein the housing is defined by three side walls including two opposed outer walls of the body of the portable device and a central outer wall between the two opposed outer walls, and wherein the rotary member is arranged on the central outer wall.

5. A portable device for an electronic key system according to claim 4, wherein the keyway of the emergency key is formed as a longitudinal depression, wherein the body of the portable device is formed in such a manner as to be disassembled into a first portion including one of the two opposed outer walls and a second portion including the other one of the two opposed outer walls and the rotary member, wherein at least one of the outer wall of the second portion having the rotary member and the wall portion formed in the body of the portable device as another other side wall of the housing is formed with a protruded portion extending into the housing, and wherein the protruded portion is fitted in the keyway of the emergency key held in the housing.

6. A portable device for an electronic key system, wherein an emergency key inserted and encased in a housing formed in a body of the portable device is formed with an engaging portion constituting a selected one of a groove and a hole in addition to a keyway of the emergency key, the engaging portion being formed substantially in a forward end of the emergency key disposed opposite to a grip of the emergency key, wherein a lock mechanism included in the body of the portable device to removably hold the emergency key inserted in the housing includes a rotatable member rotatably supported on the body of the portable device, the rotatable member including a first end and a second end, the rotatable member being adapted to rise outward of the body of the portable device as the result of the first end of the rotatable member being pushed inward of the body of the portable device, wherein the second end of the rotary member is arranged nearer to an insertion hole of the housing in which the emergency key is inserted, and wherein a part of the rotatable member nearer to the second end of the rotary member than to a rotary shaft is formed with a protrusion extending into the housing and adapted to be fitted in the engaging portion of the emergency key held in the housing, wherein the rotary shaft is arranged at right angles to the direction in which the emergency key is slid into or out of the housing, wherein the rotary shaft is located inward towards an interior portion of the portable device from a longitudinal center axis of the emergency key.

7. A portable device for an electronic key system, comprising;

a housing for encasing en emergency key, wherein the housing includes a protrusion for engaging an engaging portion on a forward end of the emergency key disposed opposite to a grip of the emergency key;

a lock mechanism for removably holding the emergency key within the housing, wherein the lock mechanism includes a rotatable member rotatably supported on the housing, wherein the rotatable member includes a first end and a second end, wherein the rotatable member is adapted to rise outwardly from the housing when the first end of the rotatable member is pushed inward of the housing, wherein the second end of the rotary member is arranged nearer to an insertion hole of the housing in which the emergency key is inserted therein; and a rotary shaft disposed at right angles to a direction in which the emergency key is slid into or out of the housing and on the longitudinal center axis of the emergency key held in the housing, wherein a part of the rotatable member nearer to the second end of the rotary member than to the rotary shaft is formed with the protrusion extending into the housing and adapted to be fit in the engaging portion of the emergency key held in the housing.

8. A portable device for an electronic key system, comprising;

an emergency key having an engaging portion disposed substantially at a first end and a grip disposed substantially at a second end;

a housing for encasing the emergency key, wherein the housing includes a protrusion for engaging the engaging portion of the emergency key;

a lock mechanism for removably holding the emergency key within the housing, wherein the lock mechanism includes a rotatable member rotatably supported on the housing, wherein the rotatable member includes a first end and a second end, wherein the rotatable member is adapted to rise outwardly from the housing when the first end of the rotatable member is pushed inward of the housing, wherein the second end of the rotary member is arranged nearer to an insertion hole of the housing in which the emergency key is inserted therein; and a rotary shaft disposed at right angles to a direction in which the emergency key is slid into or out of the housing and on the longitudinal center axis of the emergency key held in the housing, wherein a part of the rotatable member nearer to the second end of the rotary member than to the rotary shaft is formed with the protrusion extending into the housing and adapted to be fit in the engaging portion of the emergency key held in the housing.

* * * * *